Figure 1:
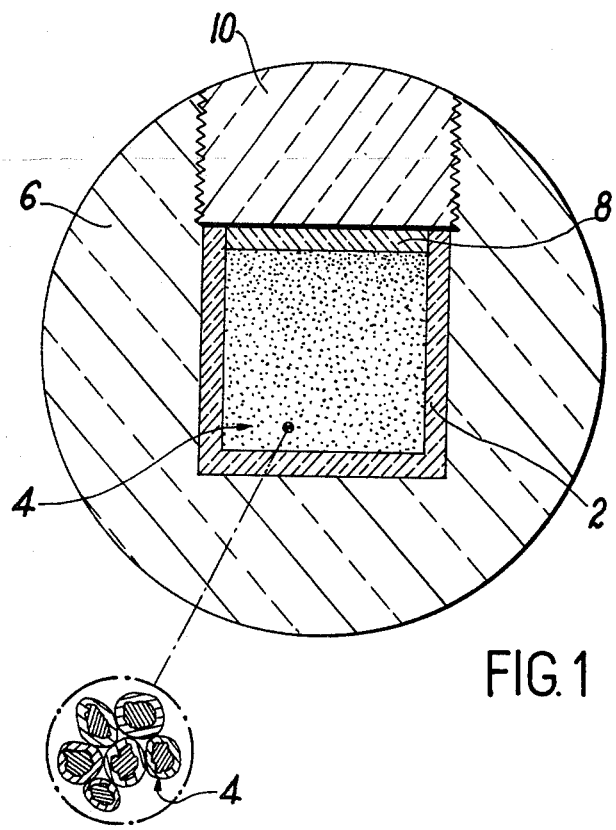

United States Patent [15] 3,668,283
Moreau [45] June 6, 1972

[54] PROCESS FOR THE FABRICATION OF NUCLEAR FUEL ELEMENTS

[72] Inventor: Claude Moreau, Seyssinet, France

[73] Assignee: Commissariat A L'Energy Atomique, Paris, France

[22] Filed: Sept. 11, 1969

[21] Appl. No.: 857,187

[30] Foreign Application Priority Data

Sept. 23, 1968 France..................................167099

[52] U.S. Cl..................................264/0.5, 176/71, 176/45, 176/89
[51] Int. Cl.........................................................G21c 21/00
[58] Field of Search..................................264/0.5; 176/71

[56] References Cited

UNITED STATES PATENTS 3,141,829  7/1964  Fortescue et al.....................176/71 X
3,156,747  11/1964  Burke.....................................264/0.5
3,309,433  3/1967  Roberts..................................264/0.5
3,331,897  7/1967  Accary et al..........................264/0.5
3,344,211  9/1967  Redding et al........................264/0.5

Primary Examiner—Carl D. Quarforth
Assistant Examiner—S. R. Hellman
Attorney—Cameron, Kerkam and Sutton

[57] ABSTRACT

A method of fabrication of nuclear fuel elements having high impermeability to fission gases and made up of refractory fuel particles dispersed in a carbonaceous matrix, said fuel particles being coated with a mixture of graphite and an organic diluent by means of a pelletizing process. An outer jacket for containing the coated particles is fabricated by shaping a paste formed of graphite powder and a binder, then baking and impregnating the jacket with pyrocarbon in a single operation by heating to a temperature between 850° and 1,100° C. in a gaseous hydrocarbon atmosphere.

9 Claims, 2 Drawing Figures

PROCESS FOR THE FABRICATION OF NUCLEAR FUEL ELEMENTS

This invention is directed to a process for the fabrication of nuclear fuel elements and especially elements consisting of a central core of refractory fuel (oxides, carbides or nitrides of uranium or plutonium) which is dispersed in a carbonaceous matrix and contained in a carbonaceous jacket.

Although their use is not limited to this particular field, fuel elements of this type find an important application in high-temperature gas-cooled reactors and make use of a material which is enriched either in the fissile isotope of uranium or in plutonium: this is particularly the case with the so-called pebble bed reactors.

It is known that the fuel elements employed in reactors of this type must permit only the smallest possible fraction of the fission gases to escape into the coolant gas. With this objective, different types of fuel elements have already been provided in the form of coated particles in a carbonaceous matrix.

In particular, French Pat. No. 1,430,350 in the name of Commissariat a l'Energie Atomique describes a process for the manufacture of a fuel element which consists in fabricating a central core by preparing a plastic paste consisting of a refractory fuel powder, of graphite powder and of a binder which is chemically compatible with said powder, in molding the paste so as to give it the shape of the central core, in drying and impregnating the central core with a gaseous hydrocarbon; in coating the core with a layer of paste which is prepared in the same manner as the paste which served to form the core but does not contain fuel material; and finally in impregnating said layer with gaseous hydrocarbons at a temperature between 800° and 1,000°C.

The fuel elements thus produced have given results which have on the whole proved satisfactory. However, the rate of fission product release remains relatively high, probably by reason of the differences in dimensional changes between the particles of refractory fuel and the carbonaceous matrix; moreover, some fuel elements exhibit incipient cracks between the central core and the jacket.

The aim of this invention is to provide a process for the fabrication of fuel elements which meets practical requirements more effectively than those which have been proposed in the prior art, particularly insofar as said process entails only relatively straightforward operations and leads to the production of fuel elements which exhibit wholly satisfactory impermeability to fission gases.

To this end, the invention proposes a process for the preparation of fuel elements comprising: coating of refractory nuclear fuel particles with a layer of graphite by spraying a mixture containing the graphite and an organic diluent; preparation of a raw jacket by shaping and drying a paste formed of graphite powder and of a binder; filling of said jacket with the coated particles; closure of said jacket by means of a plug which is formed of the same paste; baking of the jacket and impregnation of this latter with pyrocarbon in a single operation by heating to a temperature between 850° and 1,100°C in an atmosphere of gaseous hydrocarbons.

An important and original feature of the process in accordance with the invention as compared with the process described in the above-mentioned French Pat. No. 1,430,350 consists in coating the particles of refractory fuel with a pelletizing layer having a graphite base which, by virtue of its small particle size, is not liable to be impregnated during the final preparation stage and which performs a triple function. By coating the particles which have a more or less irregular shape, said layer rounds them off and causes the disappearance of ridges which constitute a potential source of internal stresses. The layer traps a substantial fraction of the recoil products. Finally, the layer plays the part of a buffer and absorbs differences in dimensional variation between the fuel and the pyrocarbon. The result thereby achieved is to improve the behavior of the fuel element under a high flux of fast neutrons which cause the greatest degree of damage and also to reduce the escape of fission gases into the coolant gas stream.

In one alternative method of coating fuel particles which is worthy of mention, a liquid mixture containing graphite is sprayed onto the particles during agitation in a rotating drum; this mixture can comprise in particular dispersed graphite and coal tar pitch in solution in a volatile organic diluent such as the light benzene hydrocarbons and advantageously benzene.

There will now be described by way of example the preparation of a fuel element of cylindrical shape which can be inserted in a bore of corresponding shape formed in a graphite sphere so as to constitute one of the balls of a reactor of the type commonly referred-to as a "pebble bed reactor" as well as the preparation of a tubular fuel element.

Figure 2:
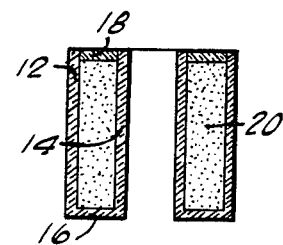

Reference will be made in the description to the accompanying drawings, in which:

FIG. 1 is a very diagrammatic axial sectional view of the cylindrical fuel element (the coated fuel particles which are shown being highly magnified for the sake of enhanced clarity);

FIG. 2 which is similar to FIG. 1 shows the tubular element.

The fuel element of FIG. 1 may be considered as constituted by an external jacket 2 formed by a matrix of carbonaceous material which contains the refractory fuel in the form of a dispersion of agglomerated particles 4 which are coated with graphite. This fuel element is placed within a sphere 6 of nuclear-grade graphite.

The jacket 2 is prepared from a paste made of powder consisting of nuclear-grade graphite and of a binder. The composition of the paste can in particular be selected from those described in the above-mentioned French Pat. No. 1,430,350.

The graphite powder advantageously consists of standard nuclear-grade graphite and passes through a screen having a mesh size of 80 $\mu$.

The binder is chosen so as to yield a low residue after coking with a view to obtaining a structure which is free from fine porosities and, at the time of subsequent impregnation, permits a gaseous hydrocarbon to gain access to all the pores. This binder can be either aqueous or organic and must evidently be compatible with the refractory fuel; when the fuel ($UO_2$ or $PuO_2$, for example) permits the use of an aqueous binder, this latter is advantageously constituted by a dispersion in water of polysaccharides, mucilages, starch or alginates and the total proportion of binder does not exceed in that case 5 percent by weight of the total quantity of dry material with which said binder is incorporated. In the case of an organic binder which must necessarily be employed with hydrolyzable fuels, there is used as binder either a drying oil (linseed oil or Chinese wood oil) or ethylcellulose dissolved in a volatile solvent such as ortho-dichlorobenzene, benzene or toluene. In particular, linseed oil has been employed in a proportion of the order of 13 percent by weight of the mixture. The graphite and the binder are mixed in a grinding mill, for example, whereupon the mixture is extruded in the shape of a cylinder and dried so as to remove the water or the solvent. This drying operation can be carried out in an oven at 240°C in the case of an organic binder. A blind-end bore is then pierced in the cylinder in order to accommodate the coated fuel particles.

Prior to being placed within the jacket, the refractory fuel particles themselves are subjected to a pelletizing process for the purpose of coating the kernels with a graphite layer. This operation is carried out by spraying onto the fuel kernels a mixture of natural graphite powder having a particle size of the order of 1 micron, of coal tar pitch and of benzene. It is possible in particular to employ a mixture containing 90 g of micronized graphite and 9 g of coal tar pitch in respect of 555 $cm^3$ of benzene. Pelletization can be carried out by spraying said mixture onto the particles which are set in motion within a rotating drum.

The maximum acceptable diameter of the fuel particles depends to a certain extent on the enrichment factor and irradiation doses which are contemplated: in the case of a pebble bed reactor in which it is desired to attain a burnup rate of 15 to 20 percent fifa (fissions per initial fissile atom) with a coolant gas temperature of 900°C, the particles have a diameter prior to coating which is advantageously within the range of 100 to 400 μ and are coated with a graphite layer having a thickness within the range of 50 to 100 μ. In the case of a reactor which is designed for lower burnup rates and a lower enrichment factor, particle diameters of up to approximately 1,000 μ may be contemplated.

Once the particles have been coated, the organic solvent (benzene, for example) is removed by evaporation. The particles to which is added a small proportion of graphite powder (passing a 100-micron aperture screen) are introduced in the jacket and lightly compacted up to the height which is intended to contain the fuel. The jacket is then closed by means of raw or "green" paste having a composition which is identical with that of the paste employed for the extrusion of the cylinder.

The paste which constitutes the jacket plug 8 is then allowed to dry, whereupon the fuel element is impregnated with pyrocarbon. This impregnation is carried out by maintaining the fuel element at a temperature within the range of 850° to 1,100°C and preferably 900° to 1,000°C in a gaseous hydrocarbon atmosphere. The operation can consist in particular in heating the fuel element progressively to about 500°C in a partial vacuum for the purpose of degassing, then in heating the element in a flow of natural gas having a base of methane up to a temperature of the order of 950°C and in maintaining it at this temperature for a period of approximately 300 hours. During this operation, the binder is carbonized and mostly eliminated. The pores of the jacket and the voids left in the mixture of particles and graphite are filled with a deposit of pyrocarbon.

The cylindrical fuel element which is thus formed can subsequently be placed within the bore of a graphite sphere or shell 6 which is provided for this purpose. The bore is then sealed for example by means of a shell plug 10 which is also made of graphite, said shell plug being screwed in position and bonded with furfuryl resin.

The fuel element which is fabricated by means of the process in accordance with the invention is free from incipient cracks and withstands high irradiation doses without excessive fission gas release. The process itself is relatively straightforward and in particular entails only a relatively small number of stages which lead in practice to a saving in time of the order of one-half compared with the process described in French Pat. No. 1,430,350.

The process described in the foregoing has been employed to prepare fuel elements of cylindrical shape having a height of 32 mm and a diameter of 19 mm whilst a central core having a height of 21 mm and a diameter of 8 mm contained the fuel in the form of a dispersion of particles. Said particles were provided in the form of spherules having an initial diameter of 100 to 200 μ and coated with a graphite-base layer having a thickness of approximately 50 μ.

The process in accordance with the invention also makes it possible to fabricate fuel elements having a tubular instead of a cylindrical shape. The tubular element which is illustrated in FIG. 2 comprises a jacket which contains the fuel material 20, said jacket being made up of two concentric portions 12 and 14 which are joined together by a base plate 16 and a jacket plug 18. The jacket is prepared from a paste having the same composition as the paste employed for the jacket 2 of FIG. 1. A cylinder having a diameter which is slightly larger than the final external diameter of the portion 12 is first extruded and then consolidated by slight pre-impregnation with pyrocarbon in order to permit of subsequent machining. It is only necessary for this purpose to increase the density of the material to a value on the order of 1.2, this being achieved by means of a short period of treatment (20 to 40 hours) in natural gas at 900°C. A central bore (internal wall of the portion 14) and the annular space which is intended to receive the fuel are then machined in the cylinder which has thus been consolidated. There is then introduced in said annular space a paste composed of a mixture of coated particles prepared in the same manner as in the previous example, of graphite powder which passes through a 100-micron aperture screen (this powder being intended to fill the voids between the particles) and a binder. The proportion can be 2 g of graphite powder in respect of 40 g of coated particles. During the course of the filling operation, the jacket is vibrated while maintaining the mixture under light compression (a few hundred g/cm²) in order that no voids should be allowed to remain. The applied pressure is sufficiently low to avoid causing damage to the pelletizing layer.

The fuel particles can either be covered simply with the pelletizing layer alone or alternatively with a composite coating (if stringent conditions of impermeability have to be satisfied). This composite coating is formed by the superposition of a coat consisting either of several layers of pyrocarbon (as obtained, for example, by thermal decomposition of hydrocarbons in a fluidized bed in accordance with a conventional technique) or of a layer of silicon carbide with an overcoating formed by the pelletizing process.

The preparation of the fuel element is completed by the main treatment of impregnation of the jacket and of the mass formed by the pelletized fuel particles and the graphite powder. This treatment is the same as was contemplated earlier in the case of the fuel element 2 and consists, for example, in maintaining at a temperature on the order of 900°C in a natural gas atmosphere. This treatment permits the achievement of two results in a single operation. The jacket acquires a high density, excellent mechanical properties and high corrosion resistance. The fuel particles are bonded together and this bond remains low in strength by virtue of the pelletizing process which prevents the fuel particles from being impregnated and permits removal of differences in dimensional changes between the fuel particles and the carbonaceous matrix in which said particles are dispersed. Finally, the fuel mass is bonded to the jacket so that the fuel element as a whole forms a continuous matrix having high thermal conductivity.

By means of the process in accordance with the invention, it is also possible to fabricate a fuel element having an annular shape but with walls in the form of spherical zones which can be interposed between a spherical central core and an external jacket which is also of spherical shape.

What we claim is:

1. A process for the fabrication of nuclear fuel elements comprising the steps of coating refractory nuclear fuel particles with a layer of graphite by spraying on the particles a mixture containing the graphite and an organic diluent; preparing a raw jacket by shaping and drying a paste of graphite powder and of a binder; filling said jacket with the coated particles; closing said jacket by a plug of said paste; baking the filled and closed jacket and then impregnating said jacket with pyrocarbon in a single operation by heating to a temperature between 850°C. and 1,100°C. in an atmosphere of gaseous hydrocarbons.

2. A process in accordance with claim 1, wherein the baking and impregnation are carried out at a temperature between 900°C and 1,000°C.

3. A process in accordance with claim 1 wherein the nuclear fuel particles have a size prior to coating which passes through a 1,000-micron aperture screen.

4. A process in accordance with claim 3, wherein the particles pass through a 400-micron aperture screen.

5. A process in accordance with claim 1 wherein said jacket is filled with a mixture of coated particles and of graphite powder which passes through a 100-micron aperture screen.

6. A process in accordance with claim 1, wherein the particles are coated with a first layer of graphite then with a pelletizing layer of micronized natural graphite having a thickness between 50 and 100 μ.

7. A process of forming nuclear fuel elements comprising the steps of applying an outer coating to refractory nuclear fuel particles, spraying a mixture containing micronized graphite powder and an organic diluent on the coated nuclear fuel particles and forming an overcoating, separately shaping and drying a paste of graphite powder and binder and forming a green jacket and a closing plug for said jacket, filling said jacket with a mixture of said overcoated particles and of graphite powder having a grain size between 50 and 100 $\mu$, closing said jacket with said plug and then backing the filled jacket and impregnating it with pyrocarbon in a single operation by heating to a temperature between 850° and 1,100°C in an atmosphere of gaseous hydrocarbon.

8. A process in accordance with claim 7, wherein the nuclear fuel particles are overcoated by spraying onto said particles which are agitated in a rotary drum a mixture of graphite and of coal tar pitch in an organic diluent.

9. A process in accordance with claim 8, wherein the mixture contains graphite having a particle size on the order of 1 micron and coal tar pitch in suspension in benzene.

* * * * *